United States Patent Office 3,105,799
Patented Oct. 1, 1963

3,105,799
CONVERSION OF STARCHES AND STARCH-LIKE SUBSTANCES INTO YEAST CELLS
Martin Torvald Tveit, Lund, Sweden, assignor to Svenska Sockerfabriks Aktiebolaget, Malmo, Sweden, a corporation of Sweden
No Drawing. Filed Nov. 28, 1961, Ser. No. 155,503
3 Claims. (Cl. 195—62)

The invention relates to a fermentation process resulting in products having a high content of proteins, vitamins and other substances valuable from the point of view of nutritional physiology. As starting material I use vegetable material containing starch and starch-like substances, such as potatoes and potato waste, artichokes, waste from starch mills and from the industry of vegetable preserves, grain and waste from cereal industries, tropical starch-containing material, such as rice, batata, tapioca, etc.

According to the invention, a substratum of such a starch-containing material is prepared, and nitrogenous and phosphorous nutritive agents are added thereto. The fermentation process is then carried out symbiotically, in that the substratum is fermented with starch-hydrolyzing yeast fungi as well as with sugar fermenting yeast fungi. Suitable hydrolyzing fungi are such belonging to the group Endomycopsis of the sub-family Saccharomycetoideae of the family Saccharomycetaceae, but also taxonomically related strains or other microorganisms capable of hydrolyzing starch are useful. Among sugar fermenting fungi I will mention fungi of the type Saccharomyces or Torula, which are capable of giving a yeast cell mass having a high content of valuable proteins, vitamins etc. Examples of such fungi are *Torulopsis utilis* (*Candida utilis*), *Candida arborea*, *Candida tropicalis*, *Saccharomyces cerevisiae*, *Hansenula anomala*, *Hansenula suaveolens* and *Mycotorula lipolytica*.

In the course of the fermentation the amylase producing fungus Endomycopsis or some other starch-hydrolyzing fungus furnishes the protein and vitamin synthesizing fungus with suitable sugar, dextrin etc. for its rapid growth and it seems probable that the latter fungus has also a beneficial action upon the former one. Thus, it has been shown that the method results in a surprisingly good yield of yeast cell substance, if the pH value is maintained within certain limits during the fermentation.

The nitrogen required for the growth is preferably supplied in the form of urea, although also other nitrogenous agents, such as ammonium salts and nitrates, may be used. Urea seems to have a certain beneficial influence upon the growth in that its addition results in an especially high yield of yeast cell substance. However, rather good yields are obtainable also by means of other nitrogenous nutritive agents, particularly ammonium salts, if the normally occurring lowering of the pH value of the fermentation solution is prevented by successive additions of small amounts of alkali. Thus, the best results are obtained, if the pH is maintained within the range of 5.5 to about 4. When using urea, the pH value remains within said range during the whole fermentation without any addition of alkali being necessary.

The method according to the invention will be illustrated below by examples which, however, must not be considered as a limitation.

*Example 1*

An aqueous slurry containing 125 g. grated potatoes and 4.5 g. dissolved ammonium sulphate per kg. of slurry was prepared and sterilized to be used as substratum. 6 kgs. of this substratum were inoculated with substantially equal amounts of *Endomycopsis fibuliger* and *Torulopsis utilis*, and the fermentation was permitted to proceed for 23 hours at 30° C., while aerating by blowing in 40 lit. of air per hour and per lit. of substratum. No adjustment of pH was made during the fermentation. On completion of the fermentation the concentration of yeast cells was $645 \times 10^6$ cells per ml. of solution. The yield of yeast substance amounted to 62%, calculated on the initial quantity of starch, and the content of raw protein of said substance amounted to 19%. 0.87% carbohydrates remained in the solution.

*Example 2*

The procedure was the same as in Example 1 except that the pH value was automatically controlled and kept at pH 5 by addition of alkali. The concentration of yeast cells was now improved to $1070 \times 10^6$ cells per ml. The yield of yeast substance was 79%, calculated on the initial quantity of starch, and the content of raw protein of said substance was 31%. 0.36% carbohydrates remained in the solution.

*Example 3*

4 kgs. of a sterile substratum containing 250 g. of grated potatoes and 2.5 g. of ammonium sulphate per kg. of substratum were inoculated with a mixture of *Endomycopsis fibuliger* and *Torulopsis utilis* and the fermentation was permitted to proceed for 48 hours at 30° C., while aerating with 40 lit. of air per lit. substratum and per hour. A constant pH value of 5.1 was maintained during the whole fermentation. On completed fermentation, the concentration of yeast cells was $1450 \times 10^6$ cells per ml. of solution. The yield of yeast substance was 73%, calculated on the starting quantity of starch. The proportion of raw protein of this substance was 29%.

*Example 4*

The experiment in Example 3 was repeated except for the modifications that 1.8 g. of urea per kg. of substratum were substituted for the ammonium sulphate and the fermentation was started at pH 5.2 without any following pH control. On completed fermentation, the concentration of yeast cells was $1640 \times 10^6$ cells per ml. of solution. The yield of yeast substance was 80%, calculated on the initial quantity of starch. The proportion of raw protein of this substance was 31%.

What I claim is:

1. A method of producing yeast cells, comprising preparing a substratum of a vegetable starch-containing material, adding nitrogenous and phosphorous nutritive agents thereto, and fermenting said substratum with *Endomycopsis fibuliger* in symbiosis with sugar fermenting yeast fungi, the pH of the substratum being kept within the range of 5.5 to 4.0 during the fermentation.

2. A method of producing yeast cells, comprising preparing a substratum of a vegetable starch-containing material, adding nitrogenous and phosphorous nutritive agents thereto, and fermenting said substratum with *Endomycopsis fibuliger* in symbiosis with *Torulopsis utilis*, the fermentation being carried out at a substantially constant pH value within the range of 5.5 to 4.0.

3. A method of producing yeast cells, comprising preparing a substratum containing potato pulp, adding nitrogenous and phosphorous nutritive agents thereto, and fermenting said substratum with *Endomycopsis fibuliger* in symbiosis with *Torulopsis utilis*, the pH of the substratum being kept with the range of 5.5 to 4.0 during the fermentation.

References Cited in the file of this patent

Cook: The Chemistry and Biology of Yeasts, Academic Press, Inc., New York, 1958, pages 32, 33, 297, 389 and 438–440. (Copy in Div. 63.)